Aug. 26, 1952  A. C. QUARNSTROM  2,608,431
BUMPER JACK AND METHOD OF APPLYING THE SAME
Filed Oct. 3, 1947
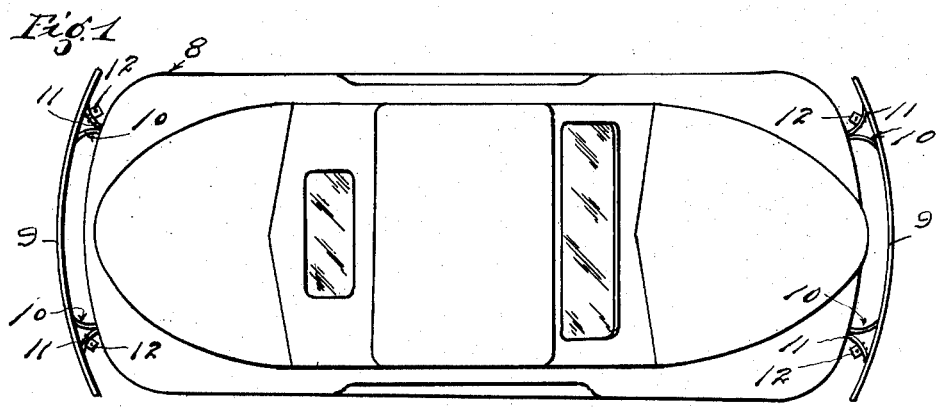
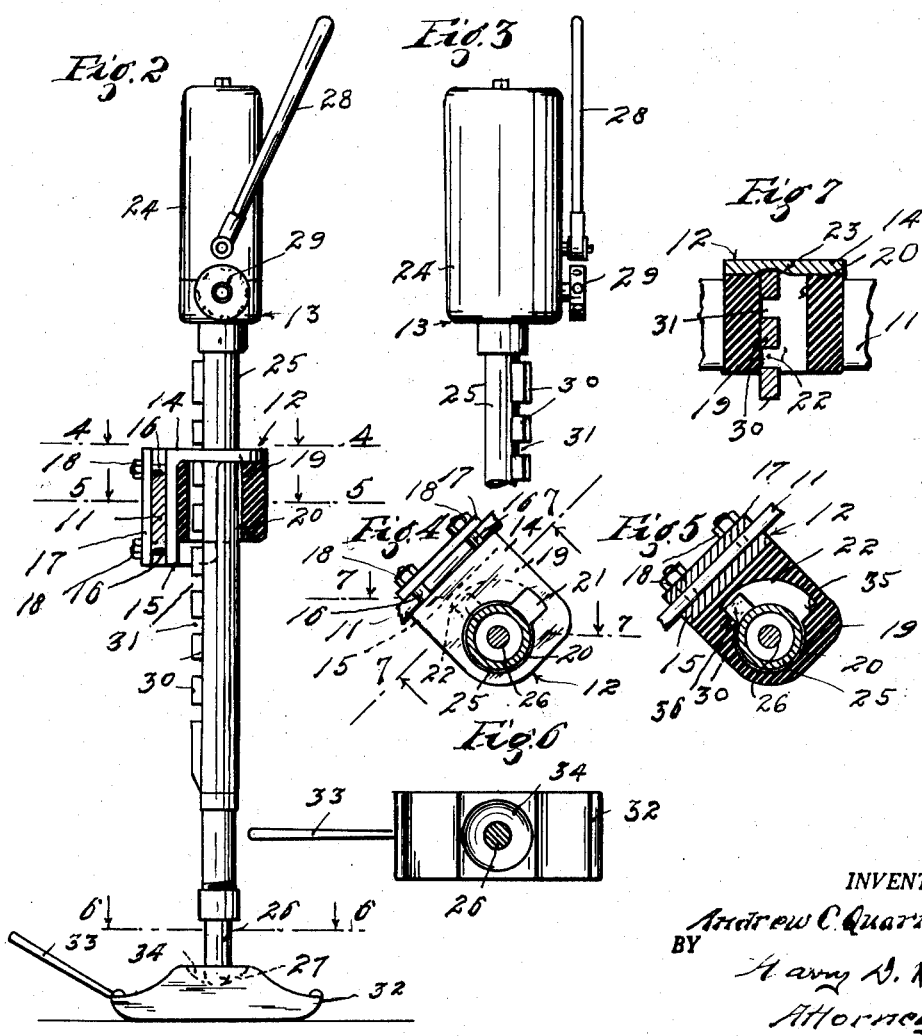
INVENTOR.
Andrew C. Quarnstrom
BY
Harry D. Kilgore
Attorney Patented Aug. 26, 1952

2,608,431

UNITED STATES PATENT OFFICE 2,608,431

BUMPER JACK AND METHOD OF APPLYING THE SAME

Andrew C. Quarnstrom, Minneapolis, Minn.

Application October 3, 1947, Serial No. 777,762

1 Claim. (Cl. 293—69)

My invention relates to improvements in lifting jacks and, more particularly, to an automobile bumper jack and method of applying the same.

It is well known that to the average automobile operator, a bumper jack is a very awkward device for the reason that he does not know the best place to apply the same in relation to a bumper, with the result that the jack, for the first trial at least, invariably slips and lets the wheel being lifted drop. Furthermore, the jack is often placed relative to a bumper in which it is necessary to lift the bumper higher than would be necessary if the jack were placed at the most advantageous point.

The principal object of this invention is to permanently embody in the front and rear bumpers of an automobile, or their attaching structures, four lifting jack abutments, one for each wheel of the automobile.

Another object of this invention is to provide bumper abutments for a lifting jack that positively positions a lifting jack relative to a wheel to be lifted and locks the jack relative to the bumper and thus prevents the jack from slipping or tipping relative to the bumper to which it is applied.

A further object of this invention is to provide a bumper jack in which its operating lever and release are above the bumper to which the jack is applied, where they can be manipulated without having to stoop or work below the bumper.

Other objects of this invention will be apparent from the following description.

To the above end, generally stated, the invention consists of the novel devices and combination of devices hereinafter described and defined in the claim.

In the accompanying drawing, which illustrates the invention, like characters indicate like parts throughout the several views.

Referring to the drawing:

Fig. 1 is a plan view of an automobile having the bumper jack abutments applied to the attaching brackets of the front and rear bumpers thereof;

Fig. 2 is an elevational view of the improved bumper jack applied to one of the abutments partly shown in section and also showing in section the bumper bracket arm to which the abutment is attached;

Fig. 3 is a fragmentary view of the upper portion of the bumper jack as viewed from the left in Fig. 2;

Figs. 4, 5 and 6 are detail views partly in plan and partly in section taken on the lines 4—4, 5—5 and 6—6 of Fig. 2; and Fig. 7 is a fragmentary detail view taken on the irregular line 7—7 of Fig. 4.

The numeral 8 indicates in plan an automobile, as an entirety, with the exception of its front and rear bumpers 9 attached thereto by brackets 10, each bracket including an outer arm 11.

Four abutments 12 for the application of a hydraulic jack 13 to either one thereof are attached one to the arm 11 of each bumper bracket 10. There is one of these abutments for each wheel of the automobile 8. While the abutments 12 are shown attached to the bumper bracket arms 11, it will be understood that they may be attached directly to the bumpers 9 or any attaching structure therefor. These abutments 12 may be applied either at the time an automobile is manufactured or at any time thereafter.

Each abutment 12 is in the form of a horizontally disposed flat plate 14 having on its inner edge portion an integral depending clamping member 15. This clamping member 15 is provided with upper and lower pairs of screw studs 16 that extend through holes in a clamping plate 17. Nuts 18 are applied to the screw studs 16 outwardly of the clamping plate 17. One of the bracket arms 11 extends between the clamping member 15 and the clamping plate 17, and the upper pair of screw studs 16 extends transversely over said arm and the lower pair of screw studs 16 extends transversely under the same. By tightening the nuts 18 on the screw studs 16, the clamping member 15 and the clamping plate 17 will be tightly clamped onto the bracket arm 11 and thereby rigidly secure the abutment 12 to the bumper bracket 10.

A rubber block 19 is rigidly secured by vulcanization or otherwise, to the under side of the abutment plate 14 and the outer face of the depending clamping member 15. Formed in the abutment plate 14 and the rubber block 19 is a long upright passageway 20 for the jack 13. Formed in the abutment plate 14 is a lug passageway 21 that extends radially into the passageway 20, and formed in the rubber block 19 at one side of the passageway 20 is circumferentially extended lug passageway 22 that forms, in part, an extension of the passageway 20. In the under side of the abutment plate 14 is a lock seat 23 in the form of a depression.

The hydraulic jack 13 includes the case 24 of a fluid reservoir having a depending cylinder 25 in which works a plunger 26 that extends outwardly of the lower end of the cylinder 25 and the lower end of the plunger 26 is rounded at 27.

A hand lever 28 is mounted on the reservoir case 24 for operating the jack to raise the same, and a hand wheel 29 is also mounted on said reservoir case for releasing the fluid and allowing the jack 13 to be lowered by the weight of the load thereon.

For the purpose of this case, it is not thought necessary to show the interior connection for operating the plunger 26 from the hand lever 28 as the same is well known.

Integral with the cylinder 25 is a column of elongated lugs 30 endwise spaced apart to leave gaps 31 therebetween.

A removable supporting base 32 is provided for the jack 13 and has a handle 33 by which it can be moved. This base 32 has in its top a concave seat 34 for the rounded end 27 of the plunger 26.

To lift one of thhe wheels of the automobile 8 by means of the jack 13 interlocked with the abutment nearest the wheel to be lifted, for the purpose of changing a tire, applying a chain or for any other reason, the base 32 is placed on the ground under the respective abutment 12. Next, the jack 13 is lifted above the abutment 12 with its cylinder 25 aligned with the passageway 20 and the lugs 30 aligned with the passageway 21. With the jack 13 thus positioned, its cylinder 25 is lowered through the passageway 20 until the rounded end 27 of the plunger 26 enters and rests on the seat 34 in the base 32. During the lowering of the cylinder 25 in the passageway 20, the column of lugs moves downwardly through the passageway 21.

Next, the hand lever 28 is manipulated to adjust the jack 13 to bring the nearest gap 31 into alignment with the abutment plate 14. The entire jack 13 is next given substantially a one-quarter turn to move the column of lugs 30 out of alignment with the passageway 20. This turning of the jack 13 relative to the abutment 12 positions the abutment plate 14 between two of the lugs 30.

The initial lifting movement of the jack 13 will first project the lug 30, next below the abutment plate 14, into the lock seat 23 and then support and lift the load on the respective abutment 12. Obviously, the lock seat 23 will securely hold the lug 30 therein and prevent the jack 13 from turning relative to the abutment 13 with which it is interlocked. By further manipulating the hand lever 28, the respective wheel may be lifted to the desired height.

From the above description, it is evident that the jack 13 may be very quickly and easily applied to any one of the abutments 12 and positively located thereby at the most advantageous position relative to the wheel to be lifted. The long passageway 20 in the abutment plate 14 and the rubber block 19 holds the jack 13 in an upright position and prevents tipping thereof relative to the abutment 12.

The rubber block 19 at the ends of the passageway 22 affords stops 35 and 36 that are engaged by certain of the lugs 30 and limit the turning of the cylinder 25 in the passageway 20. When the stop 35 is engaged by one or more of the lugs 30, the column of lugs 30 are aligned with the passageway 21 and thus permits the jack 13 to be lifted from the respective abutment 12. Engagement of one or more of the lugs 30 with the stop 36 positions the cylinder 25 with the lug 30 next below the abutment plate 14 in alignment with the lock seat 23 so that said lug will enter the same when the jack 13 is operated to lift a wheel.

It will be understood that the invention described is capable of various modifications within the scope of the invention herein disclosed and claimed.

What I claim is:

The combination with one of the bumpers of an automobile provided with a horizontally disposed lock plate having a vertical cylinder passageway and a lock lug passageway leading into the cylinder passageway, of a hydraulic jack including an upright cylinder and a supporting plunger extending into the cylinder at its lower end, and manually operated means on the upper end of the cylinder for lifting the cylinder relative to the plunger, said cylinder having external vertically spaced lock lugs, said cylinder and its lock lugs being inserted through their passageways from above the lock plate, said cylinder being turnable about its axis to bring the lock lugs out of alignment with their passageway and position one of the lock lugs under the lock plate.

ANDREW C. QUARNSTROM.

REFERENCES CITED

The following references are of record in the file of this patent:

UNITED STATES PATENTS

| Number | Name | Date |
| --- | --- | --- |
| 1,784,116 | Shevlin | Dec. 9, 1930 |
| 1,828,913 | Toomey et al. | Oct. 27, 1931 |
| 2,044,699 | Johnson | June 16, 1936 |
| 2,164,621 | Pfauser | July 4, 1939 |
| 2,215,146 | Compano | Sept. 17, 1940 |
| 2,259,789 | Akins | Oct. 21, 1941 |
| 2,369,545 | Dunn | Feb. 13, 1945 |
| 2,422,144 | Stevens | June 10, 1947 |